(12) United States Patent
Manning

(10) Patent No.: US 12,319,418 B2
(45) Date of Patent: Jun. 3, 2025

(54) ARTICULATING MOTOR MOUNT

(71) Applicant: Experimental Vehicle Engineering Ltd., Parker, CO (US)

(72) Inventor: Kerry Gregg Manning, Parker, CO (US)

(*) Notice: Subject to any disclaimer, the term of this patent is extended or adjusted under 35 U.S.C. 154(b) by 0 days.

(21) Appl. No.: 18/536,416

(22) Filed: Dec. 12, 2023

(65) Prior Publication Data

US 2024/0208659 A1 Jun. 27, 2024

Related U.S. Application Data

(60) Provisional application No. 63/477,083, filed on Dec. 23, 2022.

(51) Int. Cl.
| | | |
|---|---|---|
| *B64D 27/40* | (2024.01) | |
| *B64C 29/00* | (2006.01) | |
| *B64D 27/30* | (2024.01) | |
| *B64G 1/40* | (2006.01) | |

(52) U.S. Cl.
CPC .......... *B64D 27/40* (2024.01); *B64C 29/0008* (2013.01); *B64D 27/30* (2024.01); *B64G 1/40* (2013.01)

(58) Field of Classification Search
CPC ..... B64C 29/0008; B64C 27/28; B64D 27/30; B64D 27/40; B64G 2004/005; B64G 1/40
See application file for complete search history.

(56) References Cited

U.S. PATENT DOCUMENTS

| | | | | |
|---|---|---|---|---|
| 4,736,645 A | * | 4/1988 | Zimmer | B25J 17/0291 |
| | | | | 901/26 |
| 6,976,401 B2 | * | 12/2005 | Okamoto | B25J 17/0291 |
| | | | | 74/490.03 |
| 7,731,123 B2 | * | 6/2010 | Young | B64C 9/16 |
| | | | | 244/119 |
| 7,971,504 B2 | * | 7/2011 | Haniya | B25J 19/0029 |
| | | | | 74/490.03 |
| 10,232,959 B2 | * | 3/2019 | Moro | B64G 1/286 |
| 10,435,183 B1 | * | 10/2019 | Schwarz | B64G 1/223 |

(Continued)

FOREIGN PATENT DOCUMENTS

| | | |
|---|---|---|
| EP | 0133499 A2 | 2/1985 |
| EP | 1227759 B1 | 1/2004 |
| EP | 3174787 B1 | 5/2020 |

OTHER PUBLICATIONS

Extended European Search Report mailed Apr. 19, 2024 for related application No. EP23215069.8 (9 pages).

*Primary Examiner* — Brian M O'Hara
(74) *Attorney, Agent, or Firm* — Taft Stettinius & Hollister LLP; John Wray Carpenter

(57) ABSTRACT

An articulating motor mount assembly including a first frame segment attachable to an airframe of an aircraft. A second frame segment is rotatably coupled to the first frame segment in a plane oblique to a longitudinal axis of the first frame segment. A third frame segment is rotatably coupled to the second frame segment in a plane oblique to a longitudinal axis of the second frame segment and configured to carry a thrust device. A first actuator is positioned to rotate the second frame segment relative to the first frame segment and a second actuator is positioned to rotate the third frame segment relative to the second frame segment.

19 Claims, 9 Drawing Sheets

(56) References Cited

U.S. PATENT DOCUMENTS

| | | | |
|---|---|---|---|
| 11,697,513 B2 * | 7/2023 | Laurens | B64G 1/244 |
| | | | 244/158.6 |
| 11,933,587 B1 * | 3/2024 | Beblo | F42B 10/62 |
| 2004/0129103 A1 | 7/2004 | Kamon et al. | |
| 2022/0097837 A1 | 3/2022 | Mehrgan | |

* cited by examiner

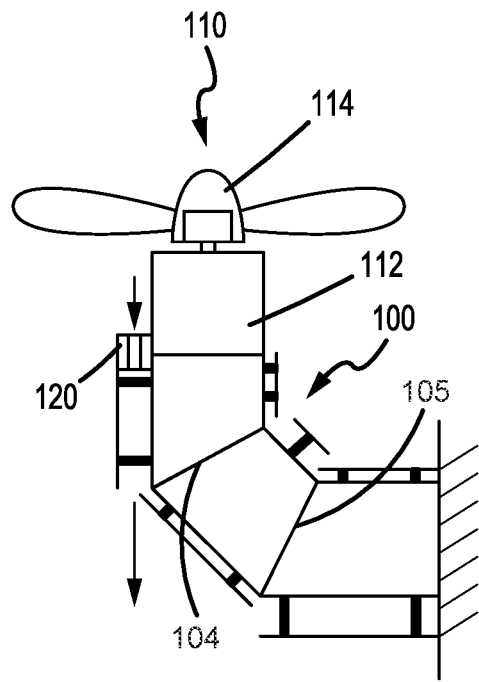
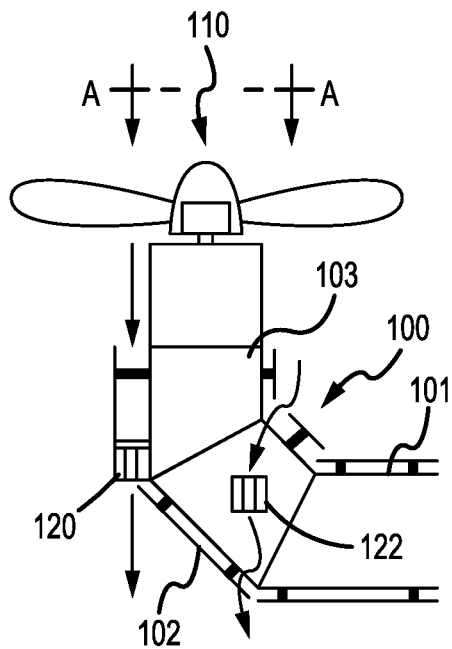
FIG.1A  FIG.1B
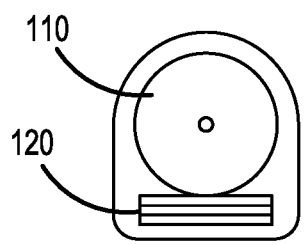
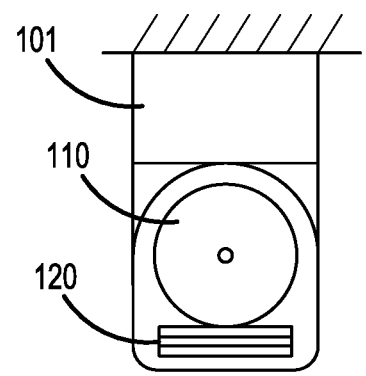
FIG.1C  FIG.1D

ARTICULATING MOTOR MOUNT

CROSS-REFERENCE TO RELATED APPLICATION

This application claims the benefit of and priority to U.S. Provisional Patent Application No. 63/477,083, filed Dec. 23, 2022, the disclosure of which is incorporated herein by reference in its entirety.

TECHNICAL FIELD

This patent application is directed to aircraft motor mounts, and more specifically, to vertical take-off and landing articulating motor mounts.

BACKGROUND

Many current electric vertical take-off and landing (eV-TOL) aircraft use lift fans that can also serve to provide cruise thrust with a mechanical linkage system setup that can include a series of hinges to allow the motor and propeller assembly to change from a vertical to horizontal orientation. While this concept is relatively simple there are areas for improvement because the mechanism has to fit inside the packaging that comprises the motor nacelles. These nacelles are often a small diameter because electric motors have high power density. Thus, fitting a conventional mechanical linkage system inside this small volume can make for structural and mechanical compromises.

SUMMARY

An articulating motor mount assembly includes a first frame segment attachable to an airframe of an aircraft. A second frame segment is rotatably coupled to the first frame segment in a plane oblique to a longitudinal axis of the first frame segment. A third frame segment is rotatably coupled to the second frame segment in a plane oblique to a longitudinal axis of the second frame segment and configured to carry a thrust device. A first actuator is positioned to rotate the second frame segment relative to the first frame segment and a second actuator is positioned to rotate the third frame segment relative to the second frame segment.

The first and second actuators can include first and second gear drive mechanisms, respectively. The first and second gear drive mechanisms can be positioned inside a corresponding frame segment. The first and second actuators can include first and second belt drive mechanisms, respectively.

The articulating motor mount assembly can include one or more fairings positioned around at least one of the first and second frame segments.

The articulating motor mount assembly can include a first fairing positioned around the first frame segment and a second fairing positioned around the second frame segment, wherein the first and second fairings are spaced apart to facilitate air flow around the motor mount assembly.

The articulating motor mount assembly can include one or more heat exchangers carried by the third frame segment.

A vertical take-off and landing vehicle includes an airframe and an articulating motor mount assembly. The articulating motor mount can include a first frame segment coupled to the airframe. A second frame segment can be rotatably coupled to the first frame segment in a plane oblique to a longitudinal axis of the first frame segment. A third frame segment can be rotatably coupled to the second frame segment in a plane oblique to a longitudinal axis of the second frame segment. A first actuator can be positioned to rotate the second frame segment relative to the first frame segment and a second actuator can be positioned to rotate the third frame segment relative to the second frame segment. A thrust device can be coupled to the third frame segment.

The first and second actuators can include first and second gear drive mechanisms, respectively.

The first and second actuators can be positioned inside a corresponding frame segment.

The vertical take-off and landing vehicle can include one or more fairings positioned around at least one of the first and second frame segments.

The vertical take-off and landing vehicle can include a first fairing positioned around the first frame segment and a second fairing positioned around the second frame segment, wherein the first and second fairings are spaced apart to facilitate air flow around the motor mount assembly.

The vertical take-off and landing vehicle can include one or more heat exchangers carried by the third frame segment.

The thrust device can include an electric motor and further comprising one or more wires connected to the electric motor and extending in an approximately helical configuration through the first, second, and third frame segments.

The thrust device can include an electric motor and further comprising one or more wires connected to the electric motor and multiple support elements extending from at least the first and second frame segments and positioned to carry the one or more wires.

An articulating motor mount assembly includes a first frame segment attachable to an airframe of an aircraft. A second frame segment can be rotatably coupled to the first frame segment in a plane oblique to a longitudinal axis of the first frame segment. The first and second frame segments define an interior region, and an actuator can be positioned in the interior region and operative to rotate the second frame segment relative to the first frame segment.

The articulating motor mount assembly can include a third frame segment rotatably coupled to the second frame segment in a plane oblique to a longitudinal axis of the second frame segment and a second actuator positioned to rotate the third frame segment relative to the second frame segment.

The articulating motor mount assembly can include an electric motor carried by the motor mount assembly and coupleable to a propeller.

The articulating motor mount assembly can include one or more wires connected to the electric motor and extending in an approximately helical configuration through the interior region.

The articulating motor mount assembly can include one or more wires connected to the motor and multiple support elements extending from at least the second frame segment and positioned to carry the one or more wires in the interior region.

BRIEF DESCRIPTION OF THE DRAWINGS

The articulating motor mount described herein may be better understood by referring to the following Detailed Description in conjunction with the accompanying drawings, in which like reference numerals indicate identical or functionally similar elements:

FIGS. 1A and 1B are side views of an articulating motor mount according to some embodiments of the disclosed technology;

FIGS. 1C and 1D are end views A-A of the articulating motor mount shown in FIGS. 1A and 1B;

Figure 2:
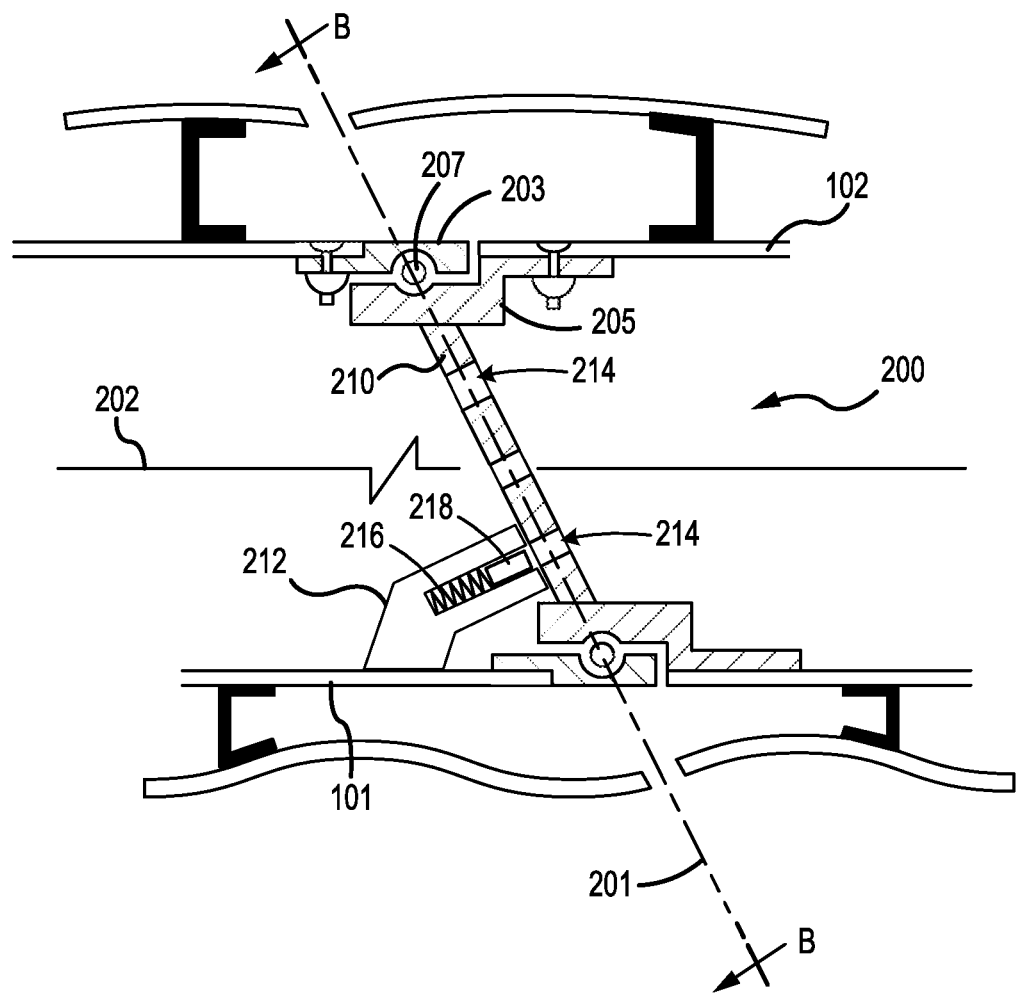
FIG. 2 is a cross-section view of a bearing according to some embodiments of the disclosed technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and alternatives falling within the scope of this disclosure.

DETAILED DESCRIPTION

Various examples of the systems, methods, and devices introduced above will now be described in further detail. The following description provides specific details for a thorough understanding and enabling description of these examples. One skilled in the relevant art will understand, however, that the techniques and technologies discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

Disclosed herein are novel eVTOL articulating motor mounts comprising a three-swivel concept (also known as an oblique swivel joint) which places all of the structure and mechanism inside the cylindrical outer shell making it act as a monocoque which is an efficient structural load path. By utilizing three swivel joints (similar to the vectoring nozzle on the Lockheed Martin F-35B) a thrust device, such as an electric motor for example, can be tilted from vertical to horizontal using the control of these three swivel joints simultaneously. Additionally, the swivel joints can be controlled and adjusted independently to not only provide a single axis of rotation, but also rotate around the length of the nacelle aligned with the electric motor axis. In some embodiments, this can be used for an additional control method as it also provides a roll axis to the lift fan.

Unlike a vectoring thrust nozzle, the bearings and motors used to control the swivel joints can be mounted inside the tube segments because the motor mount does not have the hot exhaust jet to contend with. The system has the additional advantage that everything remains enclosed and protected regardless of the position. Traditional mechanisms are open when the rotors tilt to transition and lift configuration. They are also more difficult to enclose into a smooth aerodynamic shape which can increase drag.

With reference to FIGS. 1A-1D, the articulating motor mount 100 can comprise several tubular frames 101-103 that are connected by rotational joints 104 and 105 each having their own actuator to control the rotation of the segments. The actuators can include any suitable actuator including electric motors, gear drives, linear actuators, hydraulic actuators, pneumatic actuators, and the like. Although the frames 101-103 are shown and described herein as tubular, the frames can also be open structures such as a spaceframe or other non-circular structures. The rotational joints are on an angle relative to the frames 101-103 and each other such that they can be rotated to achieve the desired tilt of the motor and propeller assembly 110 from straightforward, or straight aft in a cruise position, to more than 900 (vertical up or down) in a hover position, as shown in FIGS. 1A and 1B.

In some embodiments, the motor mount can comprise one fixed frame with one rotary joint and one movable frame. In other embodiments, the motor mount 100 can include at least two moving frame segments 102 and 103 with two rotational joints 104 and 105. By having two or more joints the system can tilt from 0 to 900 (or more) around the Y axis, rotating through the XZ plane throughout its travel (see FIG. 4B). By varying the rotation between the segments, the motor orientation can also be adjusted to vary from the XZ plane if desired. This can be done in a prescribed manner to account for the changing aerodynamic needs that are encountered during the transition between vertical and horizontal flight. This ability to vary the motor's X orientation can be used to control the aircraft, particularly during hover and transition.

As shown in e.g., FIG. 1A, the first frame segment 101 is fixed to the airframe while the thrust device or motor assembly 110 is attached to the third frame segment 103. The third frame segment 103 is configured to carry the thrust device in that it can have mounting structures including, for example, bosses and threaded fasteners, e.g., studs. In some examples, the frame segment 103 can include thrust device mounting structures including currently known structures and/or mechanisms. The motor assembly 110 can include any suitable thrust device, such as an electric motor 112 and propeller 114. In alternative examples, the thrust device can include an internal combustion engine. The motor mount can include one or more heat exchangers 120 and 122 positioned on the frame segments 101-103 and/or on the motor assembly 110.

Figure 3:
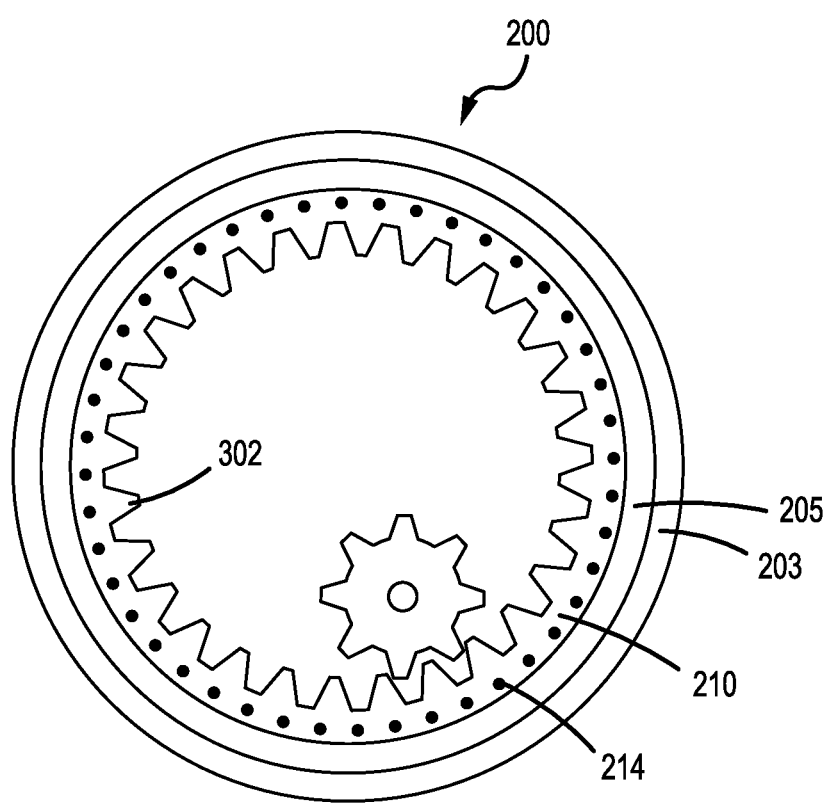
FIG. 3 is a front view B-B of the bearing shown in FIG. 2.

Moving to FIG. 2, the second frame segment 102 is rotatably coupled to the first frame segment 101 in a plane 201 oblique (e.g., 45°) to the longitudinal axis 202 of the first frame segment 101. Similarly, the third frame segment 103 is rotatably coupled to the second frame segment 102 in a plane oblique to the longitudinal axis of the second frame segment 102 (e.g., FIG. 1B). In some embodiments, the frame segments are coupled to each other with large diameter slew bearings 200, such as illustrated in FIGS. 2 and 3. A slew ring can include two or more races 203 and 205 with bearing balls or rollers 207 positioned therebetween. This type of bearing can provide a stiff, strong, and lightweight connection. In some embodiments the slew bearings 200 can be approximately the same diameter as the frame segments of the boom (the combination of frame segments is sometimes referred to herein as a boom). Alternatively, the segments can rotate around smaller, more conventional bearings. In some embodiments the first frame segment 101 can be rotatably coupled to the airframe and/or the motor 110 can be rotatably coupled to the third frame segment 103. In FIG. 3, the ring gear teeth 302 are shown oriented axially, but the ring gear teeth 302 could also be oriented axially or angles in between as it best works with the motor orientation and gear type.

In some embodiments, the system can remain locked in position when there is no power applied. This can be accomplished by using motors that are not back-drivable such as worm gear or alternatively a series of locking features can be added along the circumference of a locking ring 210 incorporated into the bearing 200. One embodiment would be a solenoid 212 that is spring loaded such that it engages a series of holes 214 in the ring 210 when power is not applied to the solenoid. When the system wants to change the orientation, the solenoid is engaged depressing the spring 216 and the pin 218 and unlocking the system to allow for rotation as shown in FIG. 2. In some embodiments the drive mechanism can include a brake to hold the position of the two segments with respect to each other.

Figure 4A:
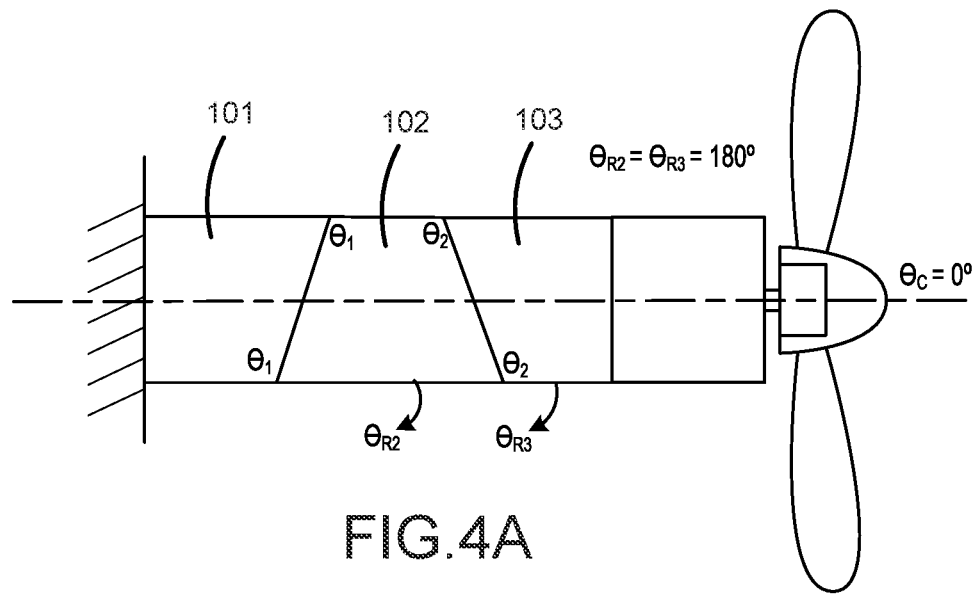
FIGS. 4A and 4B illustrate an articulating motor mount according to some embodiments of the disclosed technology in a cruise configuration and a hover configuration, respectively.
Figure 4B:
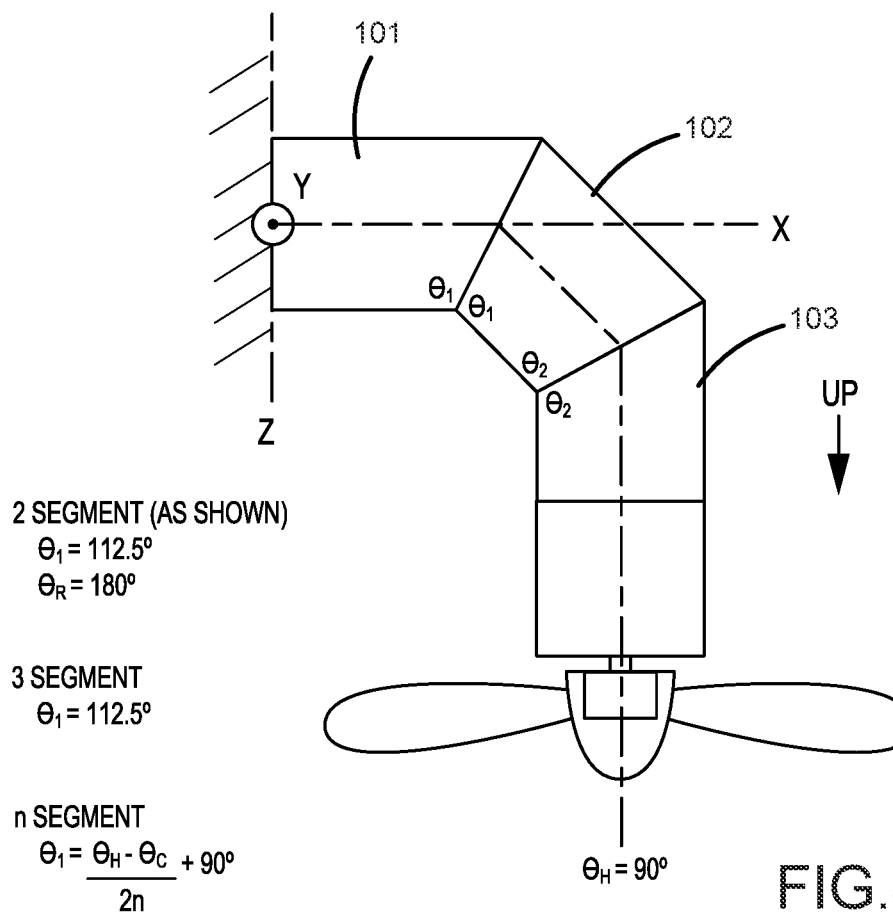

With reference to FIGS. 4A and 4B the articulating motor mount system can provide control of the motor thrust line about the Y-axis of the aircraft. But this system also gives the option for control of tilting the motor about the X-axis. This is particularly useful during hovering as it provides an additional control mode that is not available to a standard tilt mechanism. Example values and calculations are provided for various segment angles $\theta_1$, $\theta_2$, $\theta_A$, $\theta_B$, $\theta_C$, $\theta_H$, $\theta_R$, $\theta_{R2}$, and $\theta_{R3}$. For example, the equation shown in FIGS. 4A and 4B demonstrate the kinematics of one embodiment of the concept with three frames segmented at 45 degrees to achieve a +/−90° rotation along the Y axis. The angles and/or number of segments can be increased in order to achieve different kinematics.

In some embodiments, the rotational position of the segments is known and synchronized with the other segments so that the thrust line remains on the desired axis, in both the x-axis as well as a y-axis. To accomplish this the system can be driven by the known position of the tilt actuator gear or motor. By knowing the number of rotations of the drive gear, the relative position of two frames can be known with high accuracy. Additionally, a sensing system can be positioned on the rings such that the angular position between the segments is measured directly. This can be accomplished in a variety of ways including, but not limited, to hall effect sensors that detect the passing of holes 214 such as the locks that are already present, or additional features such as pins that can detect the limits of rotation via a contact switch or non-contact. This is particularly useful for startups, as the system can actuate through its full travel to be sure that everything is synchronized and aligned properly. In some embodiments, an optical system can be used, such as laser engraving of lines that are picked up by a laser or other optical sensor similar to that of a rotary encoder.

The geometry of the boom is dictated by the separation between the rotation rings. Short frame segments give the smallest package and lowest weight and result in a hover geometry that is more similar to a simple hinge. By contrast increasing the distance between rings (equally or unequally) can give a very different hover geometry where the motor is not only angled up, but also elevated. This can be beneficial for aerodynamics by giving more separation to the surrounding structure among other advantages. And it is an advantage for safety as the spinning blades can be positioned to give better clearance to people on the ground or in the vehicle. In addition to the different distances between rings the rotation angles and their orientations can be adjusted to give desired shapes not only in the cruise and hover positions but multiple unique shapes in intermediate transition positions.

Figure 4C:
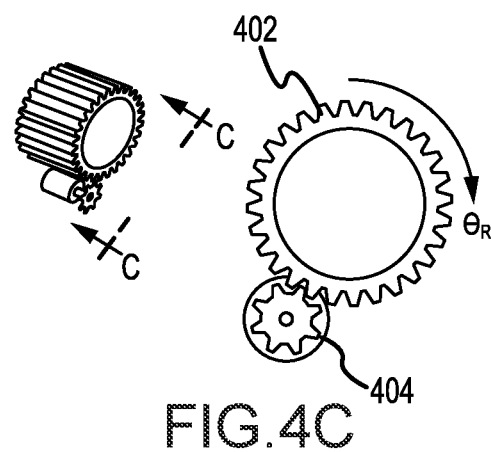
FIGS. 4C-4F are end views illustrating tilt actuator configurations according to some embodiments of the disclosed technology.
Figure 4D:
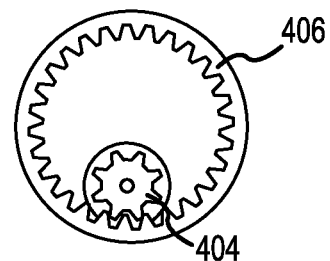
Figure 4E:
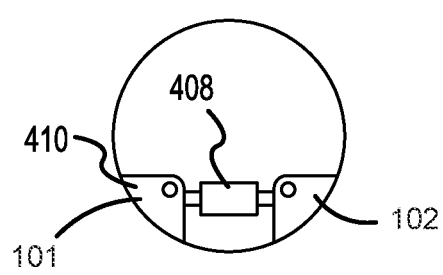
Figure 4F:
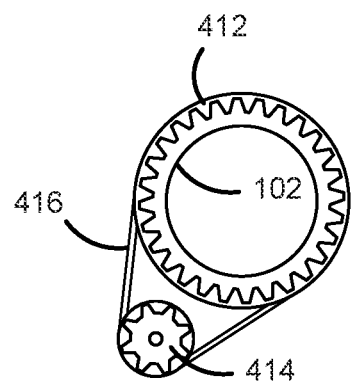
Figure 5:
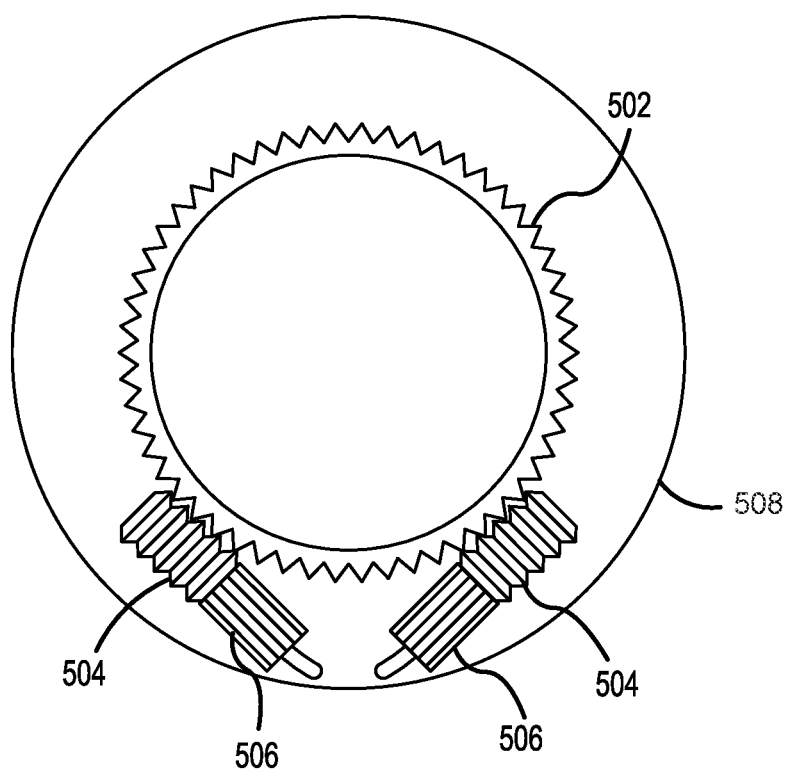
FIG. 5 is an enlarged end view illustrating a tilt motor worm drive arrangement according to some embodiments of the disclosed technology.
Figure 6A:
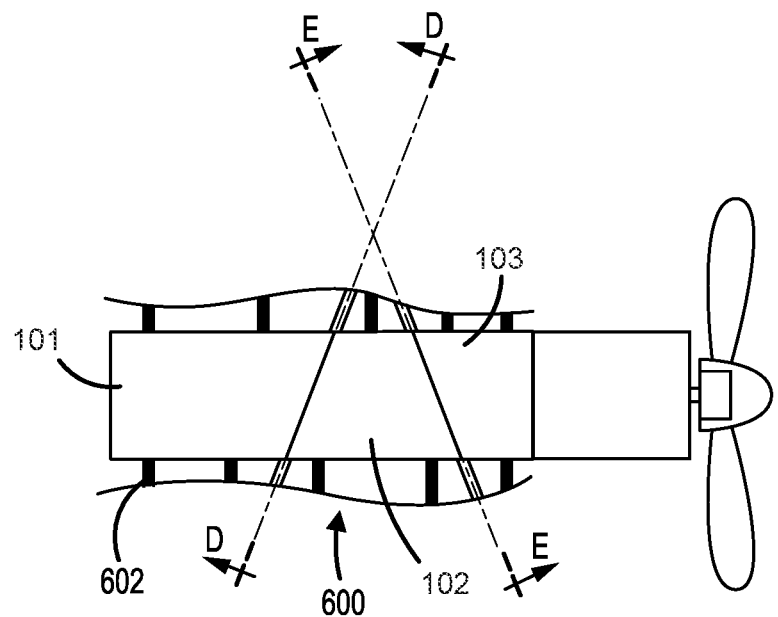
FIG. 6A illustrates a fairing configuration according to some embodiments of the disclosed technology.
Figure 6B:
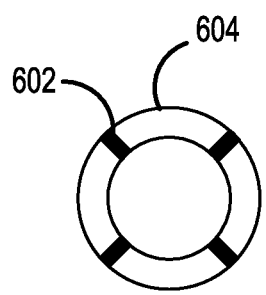
FIGS. 6B and 6C are cross-sectional views illustrating the fairing configurations shown in FIG. 6A as viewed from lines D-D and E-E, respectively.
Figure 6C:
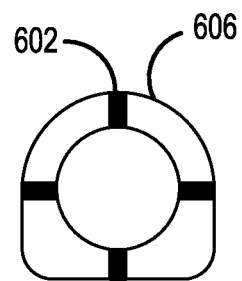
Figure 7A:
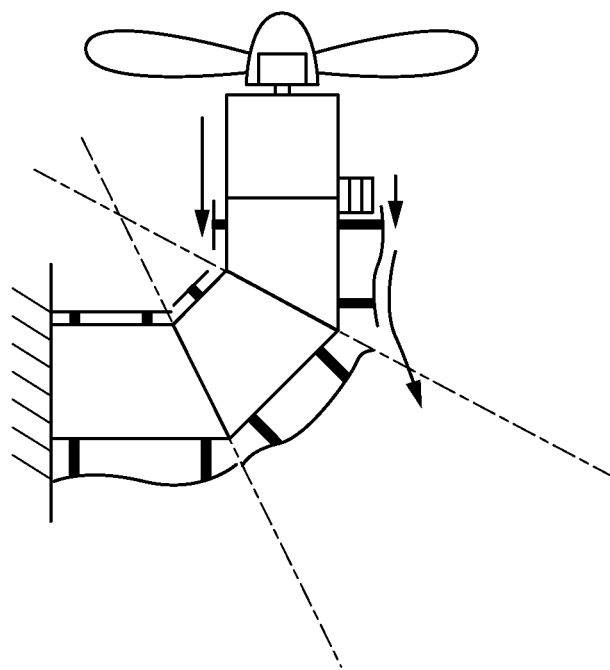
FIGS. 7A and 7B illustrate a fairing configuration according to some embodiments of the disclosed technology.
Figure 7B:
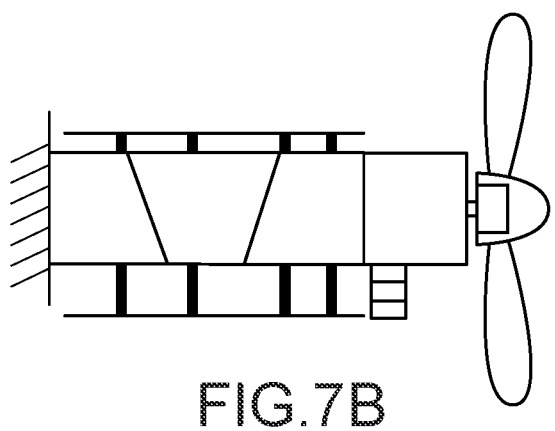

As shown in FIGS. 4C-5, the drive system can be accomplished in many different embodiments. For example, a ring gear 402/406 can be driven by a pinion gear 404 positioned outside the ring gear, as in FIG. 4C, or inside the ring gear, as in FIG. 4D. In some embodiments, the frame segments can be moved relative to one another with a linear actuator 408 (FIG. 4E) positioned between suitable mounts 410 attached to pairs of the segments, such as segments 101 and 102. As shown in FIG. 4F, the drive system can include a belt drive arrangement with a sprocket 412 positioned around a segment e.g., segment 102, and a drive sprocket 414 connected to the sprocket 412 for rotating the segment 102.

FIG. 5, illustrates a worm gear 504 that drives a ring gear 502 which is fixed to one of the frame segments. This worm gear 504 is driven by an electric motor 506 that will rotate the ring to the desired angle. The use of a worm gear has several advantages: high gear reduction and being non-back-drivable. The inherent gear reduction for a worm gear means that a smaller motor can be used while still supplying the desired torque. The non-back-drivable nature of worm gears is also advantageous because it can inherently lock the ring in the desired position unless the motor is powered to move it to a different position. This provides a level of fault tolerance and control simplification. This can be accomplished without a worm gear by simply using other gear reduction methods and/or a brake system on the motor that will hold the rings in position. Additionally, the tilt motor may be more than one motor (as shown) to provide redundancy as well as being able to eliminate any backlash in the system. Regardless of the method used, a set of interlocking teeth would either be installed on the inside or outside of the ring to allow for approximately 180° rotation. In some embodiments, the worm gear 504 can be positioned inside the ring gear 502 and drive the ring gear via a pinion gear (not shown) to provide clearance for the worm gear 504 and motor 506 (see e.g., FIG. 4D). The worm gear drives can be enclosed with a fairing 508.

With reference to FIGS. 6A-7B, in some embodiments, the rotary joints are circular, and this may limit the aerodynamic shape of the boom. In order to provide a more optimum outer mold line (OML), i.e., an aeroshell's outer surface, non-structural fairings 600 can be installed to surround the rotating frame segments. In an example, the fairings 600 can include a circular fairing 604 (FIG. 6B) and a non-circular fairing 606 (FIG. 6B). The fairings 600 can be carried by the frame segments with suitable brackets or stand-offs 602. These aerodynamic fairings can also be the structural frames, serving to support the loads from the motor in part or in whole. The structural frames are shown as tubular but can be formed into non-circular aerodynamic shapes using common aircraft construction techniques. The design of these fairings and frames can be optimized for cruise, hover, or a compromise between the two. They can also be used to open and close passages for cooling as hover typically requires significantly higher cooling flow. These passages are shown as a gap between the fairings and tubular frames but can also be formed by holes and passages in the frame structures. This fairing can also provide space for the tilt motors wiring and other systems. The fairings can be used to create optimal aerodynamic shape (e.g., non-circular cross-section). They can also be designed to reduce drag in cruise and/or hover mode. Gaps and steps can be included to cleanly separate flow and reduce drag.

Figure 8C:
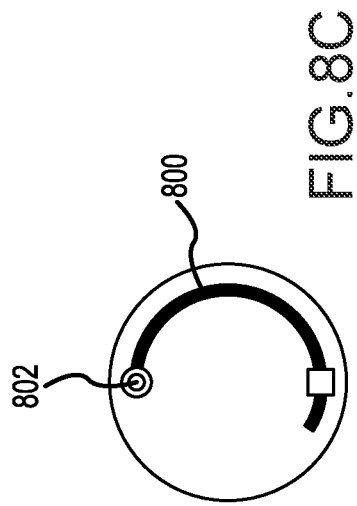
FIG. 8C is a cross-sectional view illustrating the wiring configuration shown in FIG. 8A as viewed from line F-F.
Figure 8D:
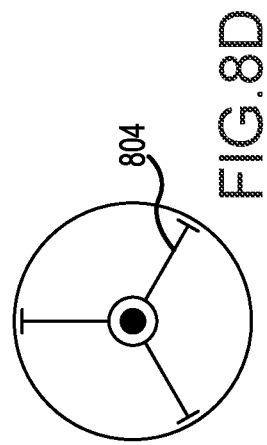
FIGS. 8D and 8E are cross-sectional views illustrating the wiring configurations shown in FIG. 8B as viewed from line G-G.
Figure 8E:
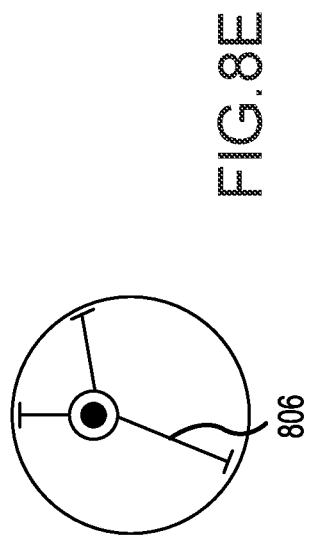
Figure 8A:
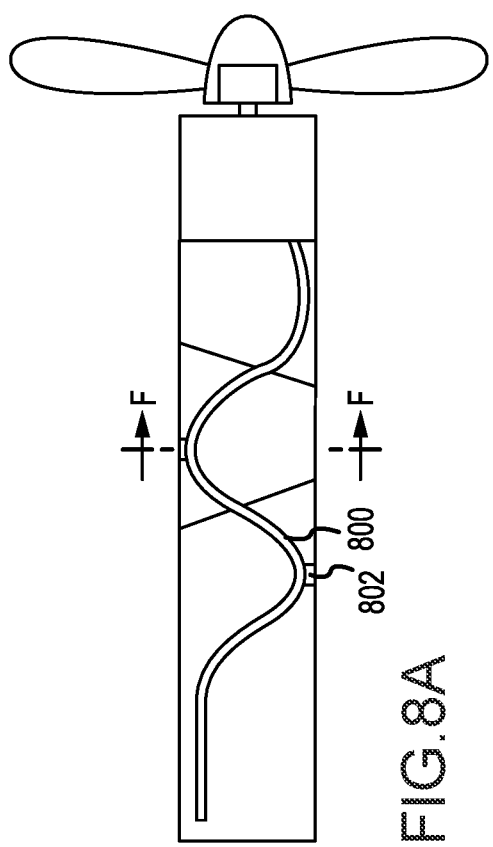
FIGS. 8A and 8B illustrate various wiring configurations according to some embodiments of the disclosed technology.
Figure 8B:
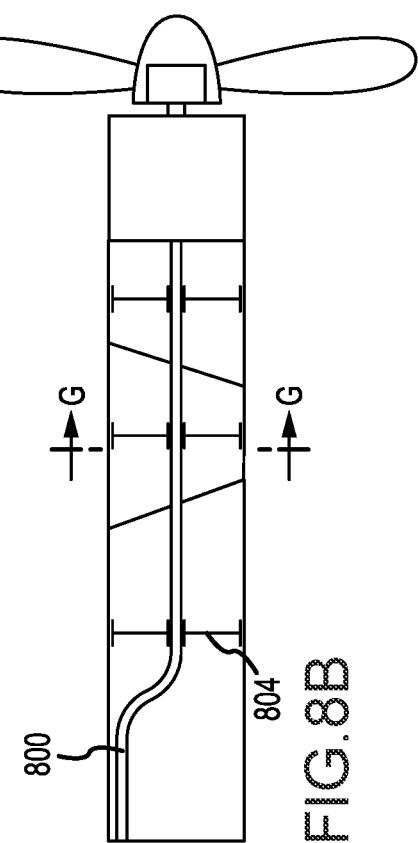

As shown in FIGS. 8A-8E, the electric motor and propeller need to be connected to the power and control systems. These systems can be primarily located on the fixed portion of the aircraft (e.g., airframe) and the subsequent wiring needs to be able to account for the tilting and rotation of the boom mechanism. This can be accomplished in several ways as shown in the figures. The wires may be subject to continual twisting. These wires can be large (e.g., high-current) and have high-voltage (e.g., 240 VDC to 1200 VDC). The disclosed wire routing solutions minimize the flexing of the cable and help prevent any stretching or rubbing of the wiring in operation. In some embodiments, the wiring 800 is wrapped on the interior of the frames in a loose approximately helical configuration and restrained with e.g., clamps 802 such that when the system is tilted the wiring is coiling and uncoiling. The wire 800 could also be supported in an interior region along the center axis of the boom with supports 804 so that the wiring is twisting but not changing in length. FIG. 8E illustrates a hybrid approach where the wiring 800 is supported inside of the boom with off-center supports 806 in a helical coil such that the wiring will not rub against the frame but also minimizes any twisting of the wiring. Supports 804 and 806 can be constructed of plastic, metal, or other suitable materials. The supports 804 and 806 can include multiple arms that extend between the frame segment and a centrally located wire holder.

In some embodiments, a VTOL aircraft having one or more articulating motor mount assemblies, comprises multiple segments that each can be rotated in a plane oblique to a longitudinal axis of adjacent segments which when rotated will orient an end segment which is configured to carry a thrust device so that the vector of the thrust can be controlled as needed for the flight of the aircraft.

In some embodiments, articulating motor mount assemblies have synchronized angular rotation of the two or more segments that allow for the thrust device to be angled in the direction needed for the given flight condition.

In some embodiments, the thrust device can rotate approximately 90° (e.g., −5° to 110°) while remaining in an approximate plane of action (transition plane) to allow the thrust vector to be transitioned from a vertical direction used for hover flight to a horizontal direction used for forward flight.

In some embodiments, articulating motor mount assemblies have asynchronous rotation of one or more segments to allow the vector to be varied outside the transition plane in order to control the aircrafts orientation and position (bank, pitch, yaw, and horizontal positioning) In some embodiments, the thrust device can be canted approximately 5°.

In some embodiments, the segments are functionally hollow structures leaving the internal volume open for systems.

In some embodiments, the internal volume is used for wiring which is located in the approximate center of the segments so that the flexing of the wiring is minimized.

In some embodiments, the wiring can be routed in an approximately helical configuration so that the flexing of the wiring is minimized.

In some embodiments, the wiring is routed at the center of rotation between the segments so that the wire is twisted instead of flexed.

In some embodiments, the outer shape of the segments is such that when in the forward flight configuration, the aerodynamic drag is minimized.

In some embodiments, the internal volume is used for the actuators in order to minimize the cross-section of the segments and decrease the aerodynamic impacts.

In some embodiments, the internal volume is used for cooling flow from the thrust device in order to decrease the aerodynamic impacts.

In some embodiments, the angular rotation between the segments is accomplished with rotary (electric or hydraulic) actuators to engage teeth on one or more segments.

In some embodiments, the teeth are engaged by one or more gears.

In some embodiments, the gear(s) design is such to prevent back drive in normal operating conditions so that the loss of an actuator will lock the system in its last position.

In some embodiments, the back-drive force of the system is sized for normal operation but will allow movement in overload cases in order to limit the critical loads imparted to the tilt system or the aircraft.

In some embodiments, the angular position of each segment is measured and controlled via a controller to achieve the desired thrust vector and verify that that vector is being achieved.

In some embodiments, the actuator drives the segments using a belt or chain.

In some embodiments, the aerodynamic shape of the separate segments is covered by separate fairings that are not the primary structure and are shaped such when in the forward flight configuration, the aerodynamic drag is minimized.

In some embodiments, actuators are external to the segments to allow easier access to the actuators for service and maintenance.

In some embodiments, the thrust generator is an electric motor turning a propeller.

In some embodiments, the thrust generator is a ducted fan with all or part of the flow from the fan being directed through the internal volume of the segments.

While the disclosed technology is amenable to various modifications, alternative forms, and combinations of features, specific embodiments have been shown and described herein. These specific embodiments should not be interpreted as unnecessarily limiting. On the contrary, the embodiments are intended to cover all suitable modifications, combinations, equivalents, and alternatives falling within the scope of this disclosure. The following provide additional suitable combinations for example and without limitation.

1. An articulating motor mount assembly, comprising: a first frame segment attachable to an airframe of an aircraft; a second frame segment rotatably coupled to the first frame segment in a plane oblique to a longitudinal axis of the first frame segment; a third frame segment rotatably coupled to the second frame segment in a plane oblique to a longitudinal axis of the second frame segment, and configured to carry a thrust device; a first actuator positioned to rotate the second frame segment relative to the first frame segment; and a second actuator positioned to rotate the third frame segment relative to the second frame segment.

2. The articulating motor mount assembly of example 1, wherein the first and second actuators comprise first and second gear drive mechanisms, respectively.

3. The articulating motor mount assembly of example 1 or 2, wherein the first and second gear drive mechanisms are positioned inside a corresponding frame segment.

4. The articulating motor mount assembly of any one of examples 1 to 3, wherein the first and second actuators comprise first and second belt drive mechanisms, respectively.

5. The articulating motor mount assembly of any one of examples 1 to 4, further comprising one or more fairings positioned around at least one of the first and second frame segments.

6. The articulating motor mount assembly of any one of examples 1 to 5, including a first fairing positioned around the first frame segment and a second fairing positioned around the second frame segment, wherein the first and second fairings are spaced apart to facilitate air flow around the motor mount assembly.

7. The articulating motor mount assembly of any one of examples 1 to 6, further comprising one or more heat exchangers carried by the third frame segment.

8. A vertical take-off and landing vehicle, comprising: an airframe; an articulating motor mount assembly, comprising: a first frame segment coupled to the airframe; a second frame segment rotatably coupled to the first frame segment in a plane oblique to a longitudinal axis of the first frame segment; a third frame segment rotatably coupled to the second frame segment in a plane oblique to a longitudinal axis of the second frame segment; a first actuator positioned to rotate the second frame segment relative to the first frame segment; and a second actuator positioned to rotate the third frame segment relative to the second frame segment; and a thrust device coupled to or carried by the third frame segment.

9. The vertical take-off and landing vehicle of example 8, wherein the first and second actuators comprise first and second gear drive mechanisms, respectively.

10. The vertical take-off and landing vehicle of example 8 or 9, wherein the first and second actuators are positioned inside a corresponding frame segment.

11. The vertical take-off and landing vehicle of any one of examples 8 to 10, further comprising one or more fairings positioned around at least one of the first and second frame segments.

12. The vertical take-off and landing vehicle of any one of examples 8 to 11, including a first fairing positioned around the first frame segment and a second fairing positioned around the second frame segment, wherein the first and second fairings are spaced apart to facilitate air flow around the motor mount assembly.

13. The vertical take-off and landing vehicle of any one of examples 8 to 12, further comprising one or more heat exchangers carried by the third frame segment.

14. The vertical take-off and landing vehicle of any one of examples 8 to 13, wherein the thrust device comprises an electric motor and further comprising one or more wires connected to the electric motor and extending in an approximately helical configuration through the first, second, and third frame segments.

15. The vertical take-off and landing vehicle of any one of examples 8 to 14, wherein the thrust device comprises an electric motor and further comprising one or more wires connected to the electric motor and multiple support elements extending from at least the first and second frame segments and positioned to carry the one or more wires.

16. An articulating motor mount assembly, comprising: a first frame segment attachable to an airframe of an aircraft; a second frame segment rotatably coupled to the first frame segment in a plane oblique to a longitudinal axis of the first frame segment; wherein the first and second frame segments define an interior region; and an actuator positioned in the interior region and operative to rotate the second frame segment relative to the first frame segment.

17. The articulating motor mount assembly of example 16, further comprising a third frame segment rotatably coupled to the second frame segment in a plane oblique to a longitudinal axis of the second frame segment and a second actuator positioned to rotate the third frame segment relative to the second frame segment.

18. The articulating motor mount assembly of example 16 or 17, further comprising an electric motor carried by the motor mount assembly and coupleable to a propeller.

19. The articulating motor mount assembly of any one of examples 16 to 18, further comprising one or more wires connected to the electric motor and extending in an approximately helical configuration through the interior region.

20. The articulating motor mount assembly of any one of examples 16 to 19, further comprising one or more wires connected to the motor and multiple support elements extending from at least the second frame segment and positioned to carry the one or more wires in the interior region.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. An articulating motor mount assembly, comprising:
   a first frame segment attachable to an airframe of an aircraft;
   a second frame segment rotatably coupled to the first frame segment in a plane oblique to a longitudinal axis of the first frame segment;
   a third frame segment rotatably coupled to the second frame segment in a plane oblique to a longitudinal axis of the second frame segment, and configured to carry a thrust device;
   a first actuator positioned to rotate the second frame segment relative to the first frame segment; and
   a second actuator positioned to rotate the third frame segment relative to the second frame segment.

2. The articulating motor mount assembly of claim 1, wherein the first and second actuators comprise first and second gear drive mechanisms, respectively.

3. The articulating motor mount assembly of claim 2, wherein the first and second gear drive mechanisms are positioned inside a corresponding frame segment.

4. The articulating motor mount assembly of claim 1, wherein the first and second actuators comprise first and second belt drive mechanisms, respectively.

5. The articulating motor mount assembly of claim 1, further comprising one or more fairings positioned around at least one of the first and second frame segments.

6. The articulating motor mount assembly of claim 5, including a first fairing positioned around the first frame segment and a second fairing positioned around the second frame segment, wherein the first and second fairings are spaced apart to facilitate air flow around the motor mount assembly.

7. The articulating motor mount assembly of claim 1, further comprising one or more heat exchangers carried by the third frame segment.

8. A vertical take-off and landing vehicle, comprising:
   an airframe;
   an articulating motor mount assembly, comprising:
     a first frame segment coupled to the airframe;
     a second frame segment rotatably coupled to the first frame segment in a plane oblique to a longitudinal axis of the first frame segment;
     a third frame segment rotatably coupled to the second frame segment in a plane oblique to a longitudinal axis of the second frame segment;
     a first actuator positioned to rotate the second frame segment relative to the first frame segment; and
     a second actuator positioned to rotate the third frame segment relative to the second frame segment; and
   a thrust device coupled to the third frame segment.

9. The vertical take-off and landing vehicle of claim 8, wherein the first and second actuators comprise first and second gear drive mechanisms, respectively.

10. The vertical take-off and landing vehicle of claim 8, wherein the first and second actuators are positioned inside a corresponding frame segment.

11. The vertical take-off and landing vehicle of claim 8, further comprising one or more fairings positioned around at least one of the first and second frame segments.

12. The vertical take-off and landing vehicle of claim 11, including a first fairing positioned around the first frame segment and a second fairing positioned around the second frame segment, wherein the first and second fairings are spaced apart to facilitate air flow around the motor mount assembly.

13. The vertical take-off and landing vehicle of claim 8, further comprising one or more heat exchangers carried by the third frame segment.

14. The vertical take-off and landing vehicle of claim 8, wherein the thrust device comprises an electric motor and further comprising one or more wires connected to the electric motor and extending in an approximately helical configuration through the first, second, and third frame segments.

15. The vertical take-off and landing vehicle of claim 8, wherein the thrust device comprises an electric motor and further comprising one or more wires connected to the electric motor and multiple support elements extending from at least the first and second frame segments and positioned to carry the one or more wires.

16. An articulating motor mount assembly, comprising:
   a first frame segment attachable to an airframe of an aircraft;
   a second frame segment rotatably coupled to the first frame segment in a plane oblique to a longitudinal axis of the first frame segment;
   wherein the first and second frame segments define an interior region; and
   an actuator positioned in the interior region and operative to rotate the second frame segment relative to the first frame segment; and
   a thrust device including an electric motor carried by the motor mount assembly.

17. The articulating motor mount assembly of claim 16, further comprising a third frame segment rotatably coupled to the second frame segment in a plane oblique to a longitudinal axis of the second frame segment and a second actuator positioned to rotate the third frame segment relative to the second frame segment.

18. The articulating motor mount assembly of claim 16, further comprising one or more wires connected to the electric motor and extending in an approximately helical configuration through the interior region.

19. The articulating motor mount assembly of claim 16, further comprising one or more wires connected to the motor and multiple support elements extending from at least the second frame segment and positioned to carry the one or more wires in the interior region.

* * * * *